(12) United States Patent
Khan

(10) Patent No.: US 7,404,258 B2
(45) Date of Patent: Jul. 29, 2008

(54) METHOD AND APPARATUS FOR TRACTOR TRAILER AXLE WHEEL ALIGNMENT

(76) Inventor: Gulshair Khan, 26 Oricle Crescent, Sherwood Park AB (CA) T8A 0B3

( * ) Notice: Subject to any disclaimer, the term of this patent is extended or adjusted under 35 U.S.C. 154(b) by 0 days.

(21) Appl. No.: 11/263,963

(22) Filed: Nov. 2, 2005

(65) Prior Publication Data

US 2007/0094882 A1 May 3, 2007

(51) Int. Cl.
*G01B 5/00* (2006.01)
(52) U.S. Cl. .......................... 33/645; 33/288
(58) Field of Classification Search ............. 33/645, 33/193, 203.18, 600, 603, 608, 612, 288, 33/264; 280/477; 116/28 R
See application file for complete search history.

(56) References Cited

U.S. PATENT DOCUMENTS

| | | | |
|---|---|---|---|
| 1,804,448 A * | 5/1931 | Wochner | 33/203.17 |
| 2,086,402 A * | 7/1937 | Countryman | 33/608 |
| 2,479,723 A | 8/1949 | Brown | |
| 2,547,580 A * | 4/1951 | Jessen | 280/137.5 |
| 2,632,256 A | 3/1953 | Will | |
| 2,845,718 A | 8/1958 | Keymer | |
| 3,088,214 A | 5/1963 | Bennett | |
| 3,137,076 A | 6/1964 | Hurst | |
| 3,279,084 A | 10/1966 | Bohlen et al. | |
| 3,325,905 A | 6/1967 | Hurst | |
| 3,417,479 A * | 12/1968 | Hirmann | 33/203.17 |
| 3,566,476 A | 3/1971 | McWorther | |
| 3,686,770 A | 8/1972 | Davis | |
| 3,691,642 A * | 9/1972 | Nolte et al. | 33/193 |
| 3,962,796 A | 6/1976 | Johnston | |
| 4,055,899 A | 11/1977 | Dean | |
| 4,347,668 A | 9/1982 | Johnston | |
| 4,413,420 A | 11/1983 | Hoffman et al. | |
| 4,569,140 A | 2/1986 | Hobson | |
| 4,800,651 A | 1/1989 | Hanlon | |
| 4,939,848 A * | 7/1990 | Armstrong | 33/608 |
| 4,942,667 A | 7/1990 | Fournier | |
| 5,044,090 A * | 9/1991 | Hunter | 33/760 |
| 5,125,164 A | 6/1992 | Fournier | |
| 5,157,838 A | 10/1992 | Sims | |
| 5,343,628 A * | 9/1994 | Ham | 33/608 |
| 5,367,778 A * | 11/1994 | O'Hara | 33/193 |
| 5,647,139 A * | 7/1997 | Richardson | 33/608 |
| 6,021,576 A | 2/2000 | Campbell | |
| 6,233,837 B1 | 5/2001 | Haglethorne et al. | |
| 6,428,030 B2 * | 8/2002 | Melesko et al. | 280/477 |
| 2005/0005461 A1 * | 1/2005 | Rohrig | 33/203.18 |

\* cited by examiner

*Primary Examiner*—G. Bradley Bennett
*Assistant Examiner*—Amy Cohen Johnson
(74) *Attorney, Agent, or Firm*—Stephen R. Burri

(57) ABSTRACT

A device for aligning with a king pin on a trailer comprising: a first bar having a first coupler at one end thereof; a bar having a second coupler at one end thereof; first and second couplers adapted for attachment to said king pin; each bar having a projection therefrom for aligning said rods on said trailer when said couplers are attached to said king pin.

15 Claims, 6 Drawing Sheets

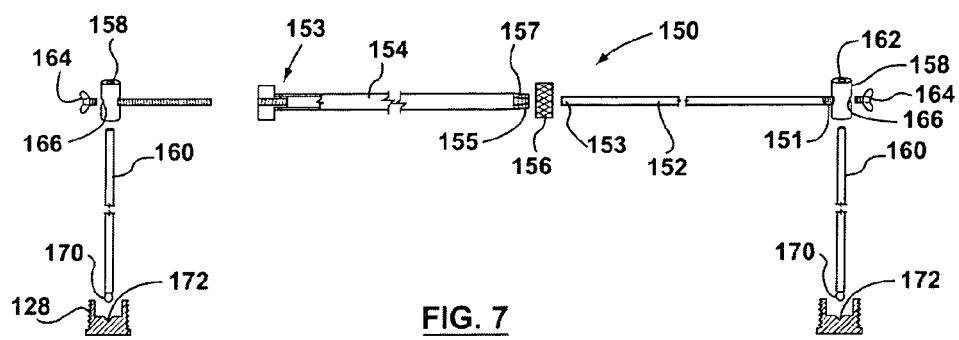
FIG. 7
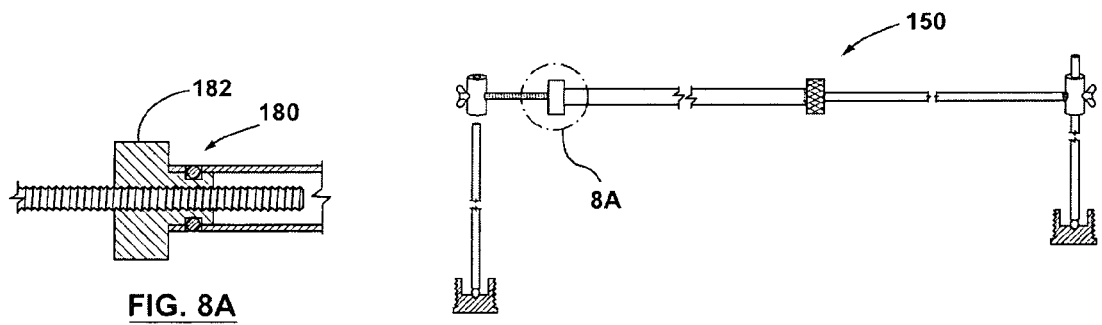
FIG. 8A
FIG. 8

METHOD AND APPARATUS FOR TRACTOR TRAILER AXLE WHEEL ALIGNMENT

FIELD OF INVENTION

This invention relates to a device for aligning with a king pin on a trailer and particularly relates to a tool for measuring the distance between axles on a vehicle. The invention also relates to a method and apparatus for aligning at least one axle on a trailer having a king pin.

BACKGROUND TO THE INVENTION

The transportation of goods by truck, rig and trailers is a key industry in modern society. However, it is not unusual for the axle or axles on a trailer to get out of alignment. This may occur on account of the trailer wheels striking an abutment or from the trailer body becoming bent or from some other reason. Such out of alignment conditions of the axle or axles of a trailer will lead to rapid tire wear which results in a big expense for the trailer owner or at the same time, creating a hazardous condition which may cause jackknifing and makes it difficult to control the trailer easily on the road.

Furthermore, there is a lateral drag on the back end of the trailer which in turn causes tire wear on the trailer tractors and difficulties in handling the tractor. Accordingly it is not unusual for tractors to run at excessive torquing. All of these conditions create unnecessary fuel consumption, deterioration in the life of the tractor, tires wearing prematurely, strain on engine parts and increased engine down time.

Accordingly, there is a need for devices to measure the distance between a plurality of axles on a trailer. There is also a need for an improved method for aligning the axles on a vehicle.

There have been a number of arrangements heretofore which have been designed for aligning axles for trailers. For example some operators use a tape measure to measure the distance between the centre line of the king pin and the ends of each axle. This tends to be inaccurate as the tape tends to sag. Furthermore obstacles under the trailer are encountered by the sagging tape making it difficult to obtain an accurate reading.

Other arrangements are shown in U.S. Pat. No. 2,479,723 which relates to a method and means for aligning the rear axles of trailers. Furthermore, U.S. Pat. No. 2,590,722 relates to a device for aligning the wheels and axles of a vehicle in relation to the line of draft of the vehicle.

Moreover, U.S. Pat. No. 2,632,256 relates to an axle alignment device while U.S. Pat. No. 2,845,718 relates to gauging and aligning devices for vehicle axles.

Another arrangement for aligning of axles of trailers is shown in U.S. Pat. Nos. 2,877,560, 3,088,214 and 3,137,076.

U.S. Pat. No. 3,162,950 also relates to a method and means for a trailer axle alignment while U.S. Pat. No. 3,279,084 relates to a trailer axle misalignment and wheel runout indicator and method.

Other arrangements for axle aligning are discussed in U.S. Pat. Nos. 3,325,905, 3,566,476, 3,686,770, 3,962,796, and 4,055,899.

U.S. Pat. No. 4,347,668 relates to apparatus for aligning the axles of trailers having an instrument case connected by an elongated spring-loaded cable to the trailer king pin and connected by a pair of cables to clips releaseably fastened on space location to the trailer axle.

Furthermore, U.S. Pat. No. 4,413,420 relates to a vehicle geometry checking apparatus or U.S. Pat. No. 4,569,140 relates to a thrust line wheel alignment apparatus and method.

Moreover U.S. Pat. No. 4,800,651 relates to an apparatus and method for aligning axles with respect to the frame of the vehicle and for determining wheel camber thereof.

Furthermore, U.S. Pat. No. 4,942,667 illustrates a portable apparatus for aligning the axles of a tractor, a trailer, or other vehicle for detecting bins, bows, twists and other irregularities in vehicle frames which a light source has used to provide a reference plane from which measurements can be taken. Such arrangement illustrates a complicated and expensive means for aligning axles on a trailer.

Further, U.S. Pat. No. 5,125,164 relates to a portable axle and frame alignment tool while U.S. Pat. No. 5,157,838 shows a vehicle axle alignment instrument and method.

A tandem axle alignment device is illustrated in U.S. Pat. No. 5,367,778 while U.S. Pat. No. 6,021,576 relates to a trailer trammel. Finally, U.S. Pat. No. 6,233,837 relates to an axle alignment system which includes a transmitter, reflector and an indicator area.

These and other devices and methods described are relatively complicated and expensive means for aligning the axles on a trailer.

It is an object of this invention to provide an improved device and method for aligning at least one axle of a wheel relative to the king pin of a trailer.

It is an aspect of this invention to provide a device for aligning with a king pin on a trailer which comprises a first bar having a first coupler at one end thereof, a second bar having a second coupler at one end thereof, whereby the first and second couplers are adapted for attachment to the king pin, each bar having a projection therefrom for aligning said rods on said trailer when said couplers are attached to such king pin.

It is another aspect of this invention to provide a tool for measuring the distance between an axle on each side of a vehicle comprising two telescoping members, a means for adjustably securing said telescoping members together, each said telescoping members having selectively displaceable axle contacting rods projecting outwardly therefrom, for measuring the distance between said axles on one side of said vehicle, and for comparing the distance between said axles on said other side of said vehicle, said axle contacting rods including rounded ends for contacting said axle.

It is another aspect of this invention to provide a method of aligning a plurality of axles on a trailer having a king pin comprising:
  placing a bar each having a first and second coupler at one end thereof and a second end thereof under said trailer;
  assembling said couplers around said king pin;
  aligning said bars relative to said trailers so as to extend said other ends of said bars on either side of said trailer;
  attaching an axle extender to each said sides of first said axle;
  connecting a plurality of measured rods together on each side of said trailer so as to close the distance of said other end of said first and second bars and said axle extenders;
  measuring said distance on each side of said trailer;
  adjusting said first axle to substantially equalize said distances.

These and other objects and features of this invention shall now be described in relation to the following drawings:

DESCRIPTION OF THE DRAWINGS

FIG. 7 is an exploded view of the tool for measuring the distance between axles on a vehicle.

FIG. 8 is an assembled view of FIG. 7.

FIG. 8a is a partial sectional view of FIG. 8

DETAILED DESCRIPTION OF THIS INVENTION

Figure 1:
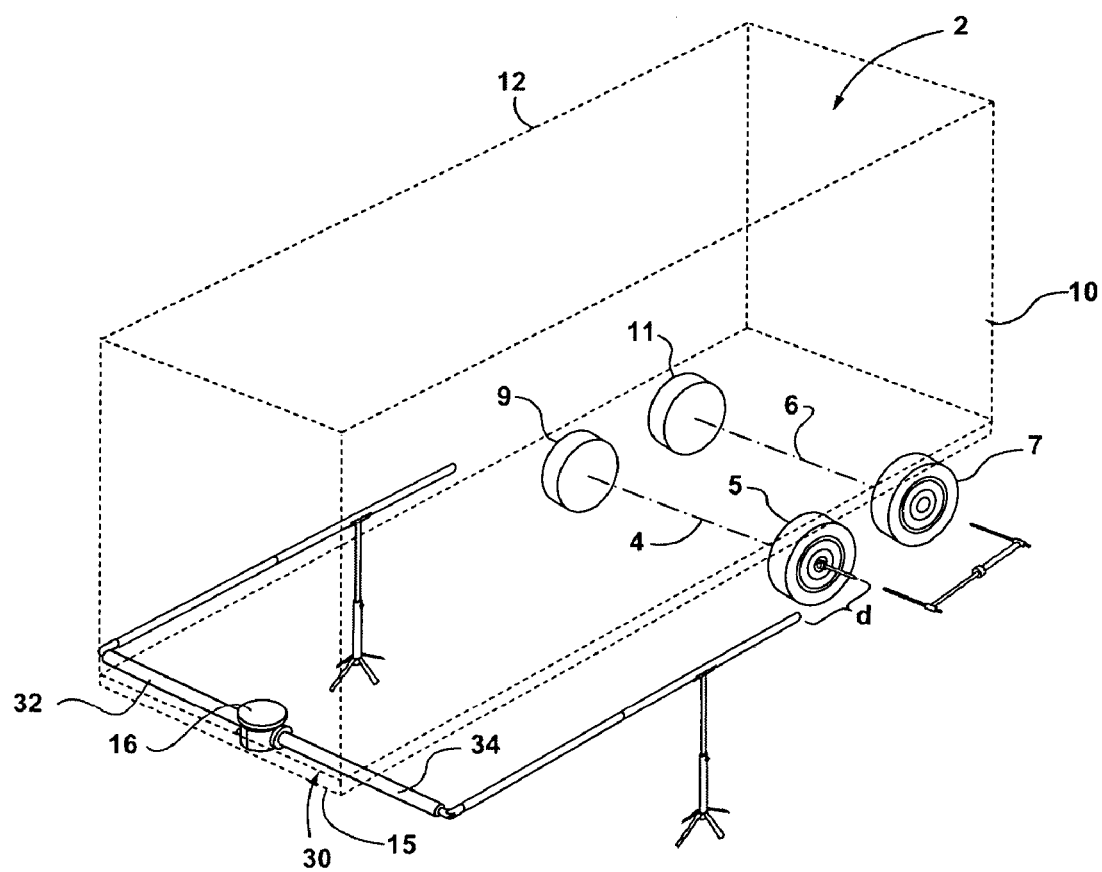
FIG. 1 is a perspective view of one embodiment of this invention.

In the description which follows like parts are marked throughout the specification and in the drawings with the same respective reference numbers. Drawings are not necessarily to scale and in some instances proportions may have been exaggerated in order to more clearly depict certain features of this invention.

FIG. 1 generally illustrates the trailer to having a plurality of axles. In the drawing a first and second axle 4 and 6 are shown, each having wheels 5 and 7 on one side of the trailer 10 respectively and wheels 9 and 11 on the other side 12 of the trailer 2 respectively. Any number of axles can be presented including one axle.

The trailer 2 is generally attached to a tractor (not shown) whereby the king pin 14 is attached to the tractor by means of a fifth wheel in the manner well known to those persons skilled in the art. The king pin 14 includes the king pin flange 16 which attaches to the trailer (not shown) in a manner well known to those persons skilled in the art.

Over time the wheels 5, 7, 9 and 11 become misaligned from a number of factors including bumping into curbs, or normal wear so that the trailer 2 no longer runs true. In other words, one of the wheels 5, 7, 9 and 11 may be pulling in a direction which is not in alignment with the forward thrust of the trailer 2. Accordingly, the relative distance between the king pin 14 and the wheels 5 and 9 are no longer equal. Furthermore, the distance between the axles of wheels 5 and 7 and 9 and 11 may also be different over time.

Figure 2:
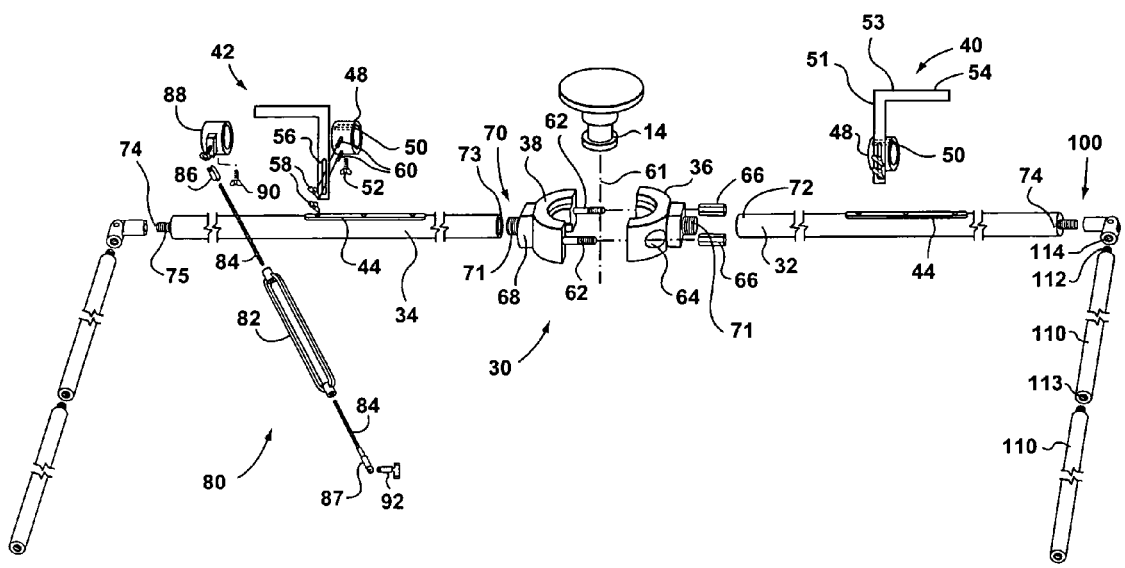
FIG. 2 is an exploded view of the device for aligning with a king pin on a trailer.
Figure 3:
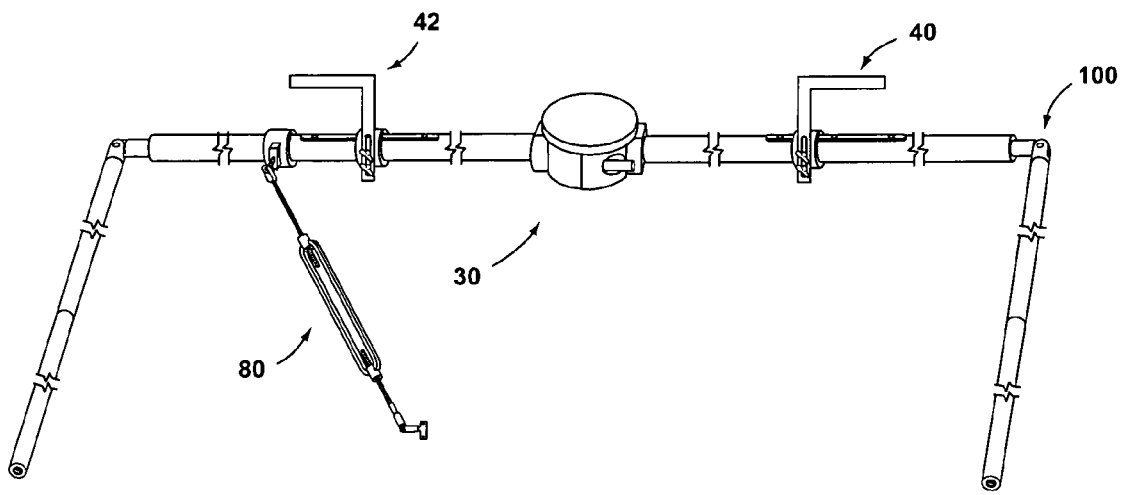
FIG. 3 is an assembled view of FIG. 2.

FIG. 1 generally illustrates a device 30 for alignment with a king pin 30 which is more fully particularized in FIGS. 2 and 3.

The device 30 for aligning or squaring the king pin onto the frame of a trailer 2 includes a first cross bar or bar 32 and a second bar 34 where the first bar 32 includes a first coupler 36 while the second cross bar or bar 34 includes a second coupler 38. The first and second couplers 36 and 38 are adapted for attachment to the king pin 14 as shown in FIGS. 2 and 3. Each of the bars 32 and 34 has projecting therefrom alignment or squaring means 40 and 42. Furthermore, the first and second bars 32 and 34 include a key 44. The key 44 can in one embodiment comprise a piece of material as shown which is connected to the bars by bolts or studs as shown. In other words, the key is fixed to the cross bars.

Each squaring means 40 includes a collar 48 which is adapted to be slidingly received by the bars 32 and 34. Each collar 48 also includes a keyway 50 which is adapted to receive the same key 44. The collar 48 includes fastening means such as a wing bolt 52 which is adapted to removably fasten the collar 48 and particularly the squaring means 40 to the first and second bars 32 and 34 as shown. The squaring means 40 also includes a square 54 which includes a slot 56 adapted to receive securing means such as wing nuts 58 adapted to protrude through the slot 56 into holes 60 presented by the collar as shown. The wing nuts permit slight tilting of the squares relative the bars 32 and 34 as the threaded bolts protruding through the slot 56 are smaller than the slot 56.

The square 54 includes an edge 53 which is parallel to the axis of the bars 32 and 34 and perpendicular to the squaring edge 51.

In this way the assembled collar shown in FIG. 3 may be squared with the trailer and particularly the trailer frame by utilizing the squaring means 40 relative thereto so as to, in affect, transfer the distance from the axis 61 of the king pin 14 to the sides 10 and 12 of the trailer 2 so as to simplify the measurement of the distance from the king pin 14 to the first axis 4.

The couplers 36 and 38 generally comprise U-shaped bearing halves which are adapted to be secured to the king pin 14. In particular, one of the couplers 38 includes fastening means such as bolt 62 adapted to be received by aligned holes 64 through the coupler 36. A plurality of hex nuts 66 can be used to assemble the couplers together. The couplers also include a portion 68 which includes means 70 for attachment to one end 72 of the first and second bars 32 and 34. In particular, the means 70 can comprise a male threaded part 71 adapted to the thready engaged by female threaded part 73 presented at one end of the pins 32 and 34 as shown. The other end 74 of first and second bars 32 and 34 also include a male threaded part 75 which, when assembled together, extends beyond the sides 10 and 12 of the trailer 2 as shown.

The device for aligning with or squaring the king pin 30 can be comprised of a variety of material such as aluminium, steel, brass, copper plastic or the like. Furthermore the equipment described herein should not be limited to any shape or size. In the embodiment shown the couplers 36 and 38 and bars 32 and 34 can be comprised of aluminium so as to be light weight. The members 68 and 71 however can be comprised of steel for durability.

Furthermore, the couplers 36 and 38 are adapted to be secured and unsecured with respect to one another so as to present a kit which can be easily stored in a small space.

Moreover, when the bars 32 and 34 are threadedly attached to the couplers 36 and 38 and the center line of the keyways will be aligned with respect to each other and will be arranged so as to be perpendicular to the axis 61 of the king pin 14 as well as the couplers 36 and 38. This assists in the squaring procedure.

Moreover, the squaring means 40 may be adjusted up or down relative to the sleeves 48 and the bars 32 and 34 by loosening nuts 58 so that the square 54 can slide relative the sleeve 48.

Once in the desired location the wing nuts 58 can be tightened so as to contact the underside of the trailer 2 and also assist for easy squaring.

A stabilizing means 80 can be included which consists of a turnbuckle 82 and two threaded rods 84 having a universal joint 86 and 87 attached at either ends thereof as shown. One of the universal joints 86 is attached to a sliding sleeve 88 which can be slid along one of the bars and secured thereto by a wing nut 90 while the other universal joint 87 is connected to connecting means 92 that can be connected to the underside of the trailer so as to secure or rejudify the alignment of the device 30 relative to the trailer 40.

Accordingly, by utilizing the device 30 as shown herein the distance from the outer end 74 of bars 32 and 34 can now be used to measure to the axis of the wheel 5 and 9. In other words the centre line 61 of the king pin 14 is in effect transferred from underneath the trailer to either side of the trailer 2 for easy measurement (once the device 30 is aligned ie the centre line of the bars 32 and 34 are parallel to the front edge 15 of the trailer 2.

The other end 74 of the bars 32 and 34 include a male thread which is adapted to receive a universal 100 as shown. The universals 100 present a 90° angle between the axis of the measured rods 110 and the bars 32 and 34 in a manner to be described herein.

In some of the prior devices the distance between the king pin and the axis of the wheels were measured by tape measure from the kingpin 14 to the wheels which tended to sag. Accordingly, inaccuracies arose.

By utilizing a plurality of measured rods 110 as described below, the accuracy of alignment is greatly improved.

Each of the measured rods 110 can consist of selected lengths. In the invention described herein each of the lengths of the measured rods 110 are equal. However, they do not have to be equal and any number of selected lengths can be selected.

Each of the measured rods 110 have a male threaded part 112 which is adapted to be threaded into a female threaded part 114 presented by the universal 100. The other end of the measured rod 110 includes a female threaded part 113 which is adapted to receive the male threaded part 112 of another measured rod 110. In this way the distance between the other end 74 of the device 30 and the first axis 4 can be closed.

In one embodiment the measured rods 110 are all exactly 5 feet in length and have ½ inch male threads on one and ½ inch female threads at the other end. The threaded parts can be made of steel for durability and can be numbered for example from $A_1$ to $A_5$ and $B_1$ to $B_5$. These measured rods can be joined together by screwing into the first piece into the universal joint at one end of the king pin bearing crossbar 30 leading to the rear towards the first axle.

Figure 4:
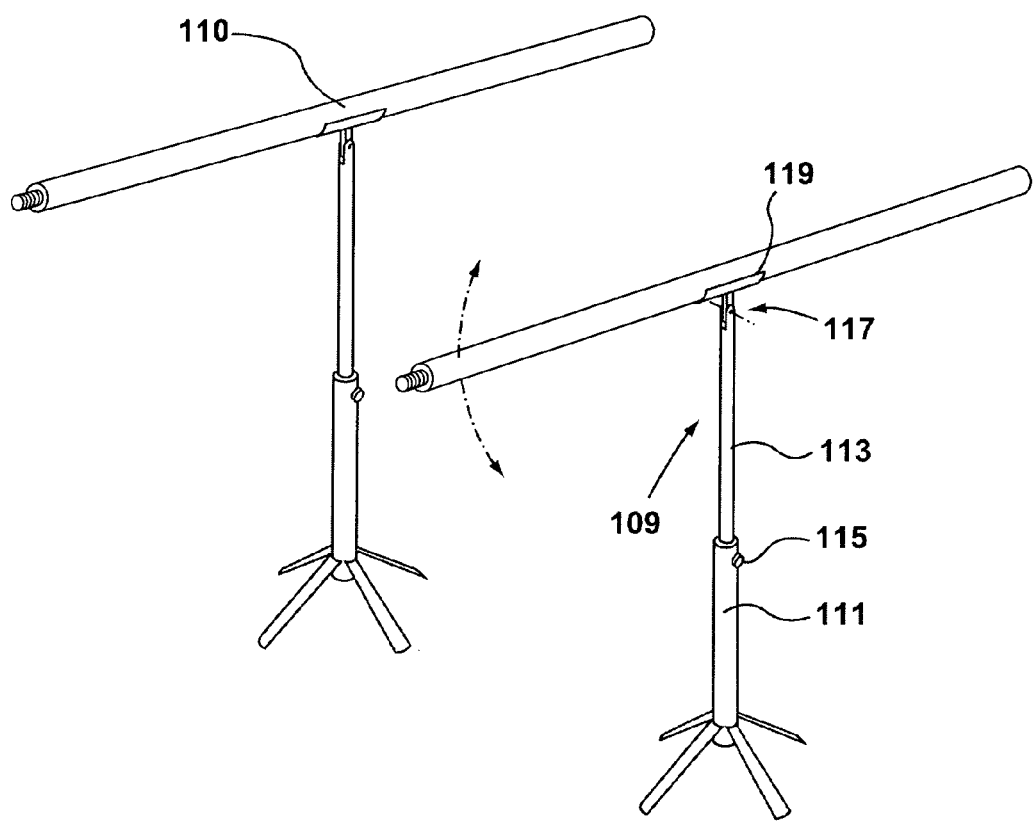
FIG. 4 illustrates a means for holding the measured rods.

As the height of the king pin 14 is generally higher than the center of the first axle, the measured rods 110 can sit on an adjustable stand 109 as shown in FIG. 4 to minimize sagging of the rods 110. The number of measured rods that are used depends on the length of the trailer unit. The adjustable stand 109 can have telescoping members 111, 113 with securing member 115 such as a bolt to fix the telescoping members together at the appropriate height to minimize sagging of measured rods 110. Also, the stand 109 includes a flexible or pivoting connection 117 for adjustment of the seat 119 and the measured rods 110 that rest on the seat 119 at appropriate angles to the horizontal. In one embodiment, for example, the seat 119 can flex 180° to create any angle there between from the higher located king pin 14 to the lower axle. However, the seat 119 could flex at any angle.

In this way the distance between the end 74 and the center of the axis is closed.

Figure 5:
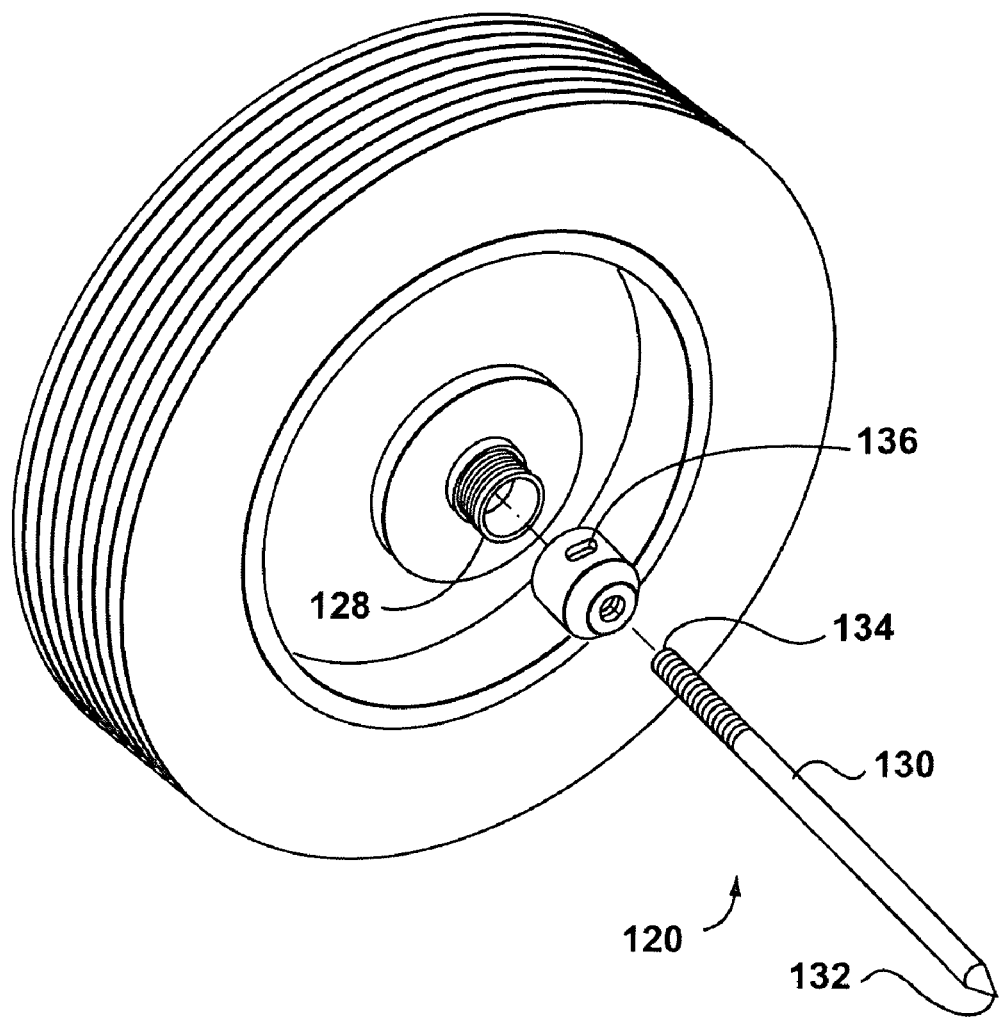
FIG. 5 is an exploded view of the axle extenders.
Figure 6:
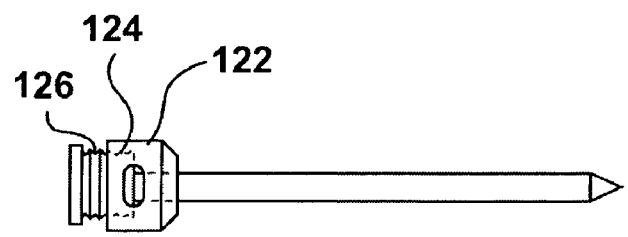
FIG. 6 is an assembled view of FIG. 5.

In order to improve the accuracy of the reading between the end 74 and the center of the first axis, an axis extender 120 as shown in FIGS. 5 and 6 can be used. The axis extender 120 include a hollow threaded housing 122 having an internal thread 124 which is adapted to be threaded to an external thread 126 presented by the axis hub 128. The housing 122 is adapted to receive the axis pointer 130 which has one pointed end 132 and another end 134 which is adapted to contact of the axis so as to thereby point or project the axis of the trailer outwardly. The axis pointer end 134 is adapted to screw into housing 122 at the outer end as shown.

In order the ensure that the second end 134 of the axis extender 130 contacts the axis on both sides 10 and 12 a window 136 is presented so as to ensure that the end 134 contacts the axis; otherwise inaccurate readings may occur. The axis extender 130 is secured to the housing by means of male threads engaging with internal female threads presented in the housing as shown in FIG. 5.

Accordingly, the distance d (see FIG. 1) may now be easily read by a tape measure or other means so as to obtain the distance between the end 74 on one side 10 of the trailer as shown.

In the example illustrated above, if four measured rods were connected as described, the distance d would represent four times the 5 feet or 20 feet. Thereafter the distance would be measured from the end of the last measured rod 110 and the pointer of the axis extender 132. If the distance d was 4 inches thereby the distance from the end 74 on one side 10 to the axis of wheel 5 would be 20 feet 4 inches. The same measurement would be taken on side 12 of the trailer and compared. If the distance was different from that on side 10 the wheels 9 could be adjusted in a manner well known to those persons skilled in the art so as to substantially equalize the distance on both sides. In this way the first axis 4 would be adjusted and be substantially parallel to edge 15.

In order to align the second axis relative to the first axis the device 30 can be removed as well as the axis extender 120.

Thereafter the tool 150 shown in FIGS. 7 and 8 for measuring the distance between axis 4 and 6 can be utilized.

The measuring tool 150 comprises of two telescoping members 152 and 154 which can be selectively adjusted in length and locked relative to one another by knurled nut 156. In one embodiment the end of one of the telescoping pieces 154 can be slotted at 157 as shown. The nut 156 is threaded onto the end of 157 of the fingers 155. The fingers are tapered and grasp end 153 of the other telescoping rod so as to be secured thereto. However other means can be used.

The outer ends 151 and 153 of telescoping rods 152 and 154 are connected to a hollow sleeve 158 which are adapted to slidingly receive therein measuring rods 160. The measuring rods 110 are for secured in the bore 162 by means of a threaded head wing bolt 164 which is adapted to be received by threaded hole 166 of the sleeve 158. Accordingly, each telescoping member 152 and 154 has selectively displaceable axle contacting rods 160 projecting outwardly therefrom from measuring the distance between the axles 4 and 6 on one side of the trailer. This measured distance is then compared to the measured distance between the axis 4 and 6 on the other side 12 of the vehicle. Each of the axle contacting rods 160 includes a rounded end 170.

Most trailer axles have a counter sunk hole 172. By utilizing a rounded end 170 the rounded end easily and snugly fits into the counter sink 172 between axles 4 and 6 so as to easily measure the distance between the axles. It should be noted that at the counter sink in many of the axles is an inherent part and in some cases has been formed by locating the axle when manufactured in a lathe. In some cases the counter sink may need to be exposed if a hubcap is utilized. The tool 150 can be utilized by one person as the rounded ends easily locate in the counter sink 172.

A fine adjustment mechanism 180 is located on one of the telescoping members as shown, can be utilized so that the user can turn the knurled nut 182 and accurately measure the distance between axles 4 and 6.

The device shown in FIGS. 7 and 8 may include numbers or measuring indicia or alternatively, may be devoid of any measurements apart from the fact that the distance between axles 4 and 6 may be set by the device shown in FIG. 7 and thereafter compared with the distance between the axis on the other side of the trailer. If necessary the distance can be adjusted in an appropriate manner so as to substantially adjust the axles 4 and 6 on each side of the trailer to be equal.

By utilizing the invention described herein on obtains the following advantages:
1. more accurate readings;
2. better fuel economy;
3. less global warming;
4. tires, engine last longer;
5. perception that the loads are lighter; and
6. less repair work.

Since changes in and/or additions to the above described best mode may be made without departing from the nature, spirit or scope of the invention, the invention is not to be limited to said details.

I claim:

1. A device for aligning with a king pin on a trailer, the device comprising:
    (a) a first bar having a first coupler at one end thereof;
    (b) a second bar, co-linear with said first bar, having a second coupler at one end thereof;
    (c) first and second couplers adapted for attachment to said king pin;
    (d) each bar having a projection therefrom for aligning said bars on said trailer when said couplers are attached to said king pin; and
    (e) first and second sleeves carrying squaring means;
wherein said bars include a key.

2. A device as claimed in claim 1 wherein said sleeves each contain a keyway.

3. A device as claimed in claim 2 wherein said key engages said keyway on said bars to align said squaring means relative thereto.

4. A device as claimed in claim 3 wherein such squaring means are displaceable relative said bars.

5. A device as claimed in claim 4 wherein said bars each include an attachment.

6. A device as claimed in claim 5 further including means for stabilizing said device relative said trailer.

7. A device as claimed in claim 6 further including measured rods adapted for connection to said attachment on each said bar and disposed towards an axle of the trailer.

8. A device as claimed in claim 7 including a plurality of measured rods.

9. A device as claimed in claim 8 further including a first and second housing for attachment to each end of said axle respectively, said housing including an axle extender.

10. A device as claimed in claim 9 wherein said housing includes a window for viewing said axle extender contacting said axle.

11. A method of aligning at least one axle on a trailer having a king pin, comprising:
    (a) placing a first bar having a first coupler at a first end thereof under a first side of a trailer adjacent a king pin;
    (b) placing a second bar, co-linear with said first bar and having a second coupler at a first end thereof, under an opposed second side of the trailer adjacent the king pin;
    (c) assembling said first and second couplers around said king pin;
    (d) aligning said first and second bars relative to the trailer so as to extend a second end of each of the first and second bars to either side of the trailer;
    (e) attaching an axle extender to each side of a first axle;
    (f) connecting at least one measured rod on each side of said trailer between the second end of each bar and an outer end of each adjacent axle extender;
    (g) measuring the distance on each side of said trailer between the second end of each bar and an outer end of each adjacent axle extender; and
    (h) adjusting said axle to substantially equalize the distances between the second end of each bar and an outer end of each adjacent axle extender on each side of the trailer.

12. A method as claimed in claim 11 wherein said axle extenders are removed when said first axle is adjusted.

13. A method as claimed in claim 12 further including means to adjust the distance between a first and second axle.

14. A method as claimed in claim 13 wherein the distance between said first and second axles are measured by a measuring tool having projecting rounded ends adapted to contact a counter sink hole presented by said axles.

15. A method as claimed in claim 14 wherein said distance between said rounded ends on said measuring tool on one side of said trailer is compared with the distance between said rounded ends on said axle on said other side of said trailer.

* * * * *